Sept. 20, 1960     T. J. ROWAN     2,952,868
MANUFACTURE OF INDIUM SPHERES
Filed March 7, 1958
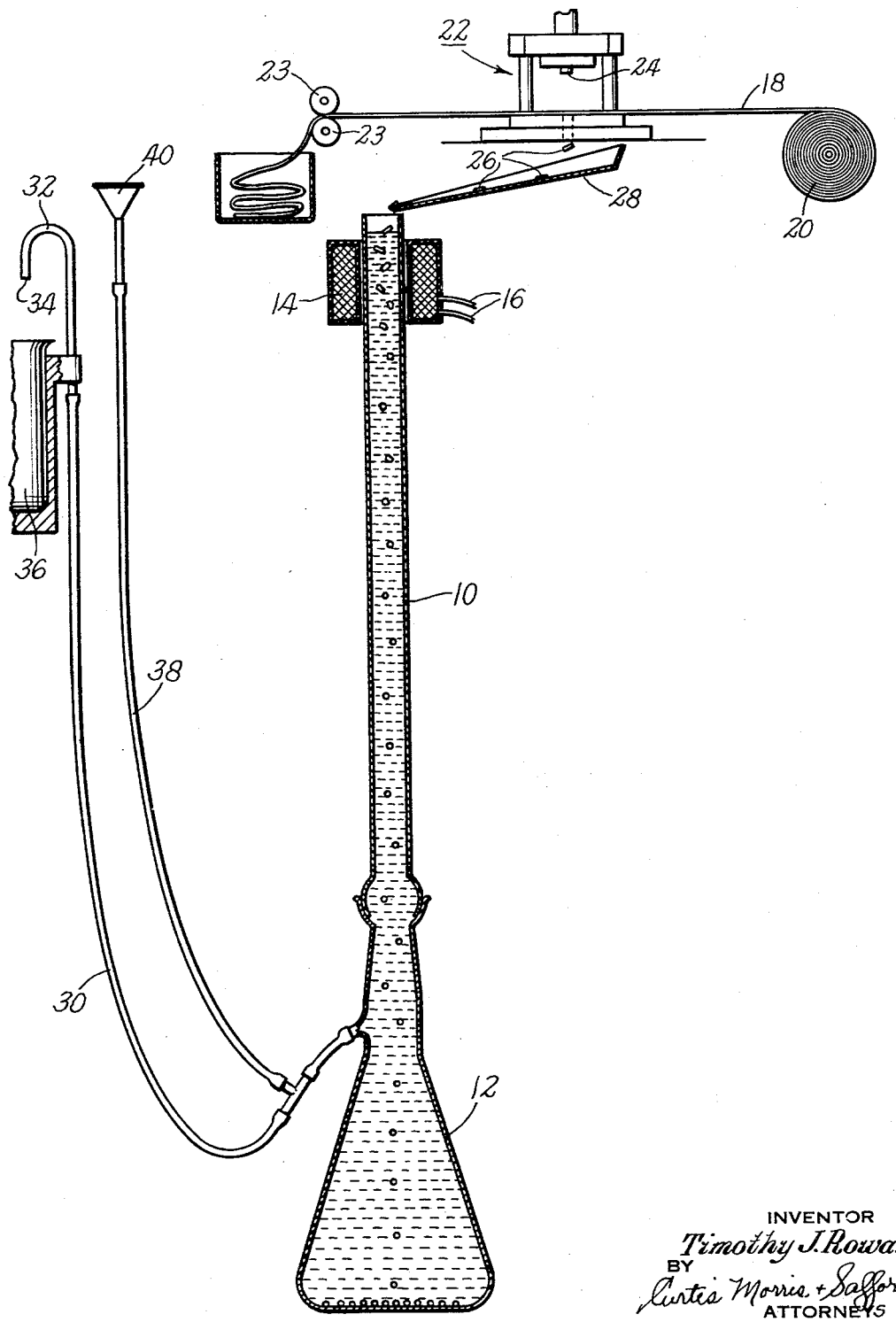
INVENTOR
*Timothy J. Rowan*
BY
*Curtis Morris + Safford*
ATTORNEYS

United States Patent Office 2,952,868
Patented Sept. 20, 1960

2,952,868
MANUFACTURE OF INDIUM SPHERES

Timothy J. Rowan, Vernon, N.Y., assignor to The Indium Corporation of America, Utica, N.Y., a corporation of New York Filed Mar. 7, 1958, Ser. No. 719,959

7 Claims. (Cl. 18—1)

This invention relates to a method and apparatus for making small, uniformly-sized metal spheres, i.e. spheres of the order of 0.001" to 0.1" in diameter. More particularly the invention is concerned with a method and apparatus for making such spheres out of a relatively low melting point metal.

The rapid growth in the manufacture and use of electrical transistors has created a demand for substantial quantities of small pellets of certain metals and alloys, which pellets must have accurately uniform sizes, shapes and masses within very close tolerances. It is evident that if the required quantities of pellets are to be produced economically, a mass production type of method must be used. In the case of low-melting-point metals and alloys one method that has been used with some success involves pouring the metal in molten form into a relatively cool liquid medium in such manner as to cause a stream of the metal to break up into droplets which solidify to form spheres of approximately the correct diameter. The spheres are then graded by the use of screens or other mechanical separating devices to isolate the spherical pellets having the desired diameter. By proper control of the pouring technique it is possible to obtain pellets having a size distribution such that it includes a substantial proportion of spheres having a predetermined desired diameter.

Although this prior method has been extensively used, it is open to a number of objections. Thus the mechanical separation of such tiny pellets to segregate or isolate pellets having a particularly desired diameter within close limits is a laborious procedure. Moreover, a large proportion of the pellets must be rejected because they fail to meet the desired specification as to size and must be re-processed. An even more serious difficulty arises out of the fact that the pellets produced are not perfectly spherical. In terms of ultimate use the primary requirement is that pellets be uniform in mass rather than uniform in diameter, that is to say, the objective of the method is to produce pellets having a generally spherical configuration and having masses that are uniform within very close limits. The mechanical sorting devices used separate the pellets primarily in terms of their diameters and fail to take into account eccentricities in configuration of the particles. Because of these eccentricities pellets of a given nominal diameter may vary substantially in mass.

It is accordingly an object of the present invention to provide a method of making spherical pellets of a low melting point metal having more nearly uniform masses than has previously been possible. It is another object of the invention to provide a method of making such pellets which gives a substantially increased yield of pellets having a predetermined desired mass. It is still another object of the invention to provide a method of making such pellets which eliminates the necessity of laborious mechanical sorting of the pellets. It is still another object of the invention to provide a novel apparatus for carrying out the method. Other objects of the invention will be in part obvious and in part pointed out hereafter.

The objects of the invention are achieved in general by pre-forming non-spherical pellets of the low melting point metal in such manner that the non-spherical pellets have accurately uniform masses and then converting the non-spherical pellets into spherical form. It has been found that small pellets or pieces of the desired metal having uniform masses within very close limits can be made by causing a sheet or strip of metal of accurately predetermined thickness to pass through a punch press and punching small discs, squares or other types of platelets of the metal therefrom. The punched pieces of metal are then melted in a heated liquid medium as described hereafter to form droplets which are subsequently cooled to solidify them to form solid spheres.

It has been found that the present method has substantial advantages over the prior method described above. Since the masses of the pellets are predetermined before they are spheroidized, the yield of spherical particles of the desired type is virtually 100%. Thus expensive reprocessing of a large proportion of the spheres formed is eliminated. Also the need for laborious mechanical separation of the particles is eliminated. It has been found that by using the present method it is possible to produce, on a mass basis, spheres which vary in mass no more than plus or minus about 2%.

The present method and apparatus are applicable to the production of metal spheres made of low melting point metals generally. For purposes of illustration the invention will be described in relation to the reduction of spheres made of elemental indium. However, the method and apparatus may be used for producing spheres of many other metals and alloys. The metals that may be used include indium, lead, tin, gallium, zinc, cadmium and bismuth as well as alloys of these metals with each other and with other metals. Typical alloys that may be spheroidized by using the present invention include 75% indium, 25% cadmium; 99% lead, 1% arsenic; 60% tin, 40% lead; 75% lead, 25% indium; 50% tin, 50% lead; 50% tin, 50% indium; 97.5% indium, 2% silver, ½% gallium; 97% indium, 3% germanium; 98% indium, 2% antimony; 98% indium, 2% zinc; 85% indium, 15% gold; 75% indium, 25% cadmium; and 99.5% indium, ½% aluminum. The phrase "low-melting-point metal" is used herein in its broad sense to comprehend both elemental metals and alloys having relatively low melting points.

As indicated above the pre-formed metal platelets having accurately uniform masses are spheroidized by immersion in a heated liquid medium to form molten metal droplets which are then cooled to form solid spheres. Spheroidizing of the platelets according to the present invention is effected by establishing a vertical column of a suitable liquid medium and heating an upper portion of the column to a temperature above the melting point of the metal used. The platelets are caused to fall downwardly through the liquid column in such manner that they melt in the heated portion of the column and solidify in the lower, relatively cooler portion of the column. The spheres thus formed are collected in a suitable receptacle near the bottom of the liquid column.

The liquid medium used must, of course, have a boiling point higher than the melting point of the metal being processed. It should be non-reactive toward the processed metal and, if combustible, should have a flash point above the melting point of the metal. It is evident that a wide variety of liquids meet these requirements. Typical liquid media that have been found to give satisfactory results when used in carrying out the present process are mineral oil and ethylene glycol.

The many objects and advantages of the present invention may best be understood and appreciated by reference to the accompanying drawing which illustrates apparatus incorporating a preferred embodiment of the invention and capable of carrying out the method of the invention. Referring to the drawing, the numeral 10 designates a vertically arranged tube that is mounted on a receiving flask 12. The tube 10 and flask 12 are substantially filled with a mineral oil such as that sold under the trade name "Nujol." Surrounding the tube 10 near the top thereof there is an electrical heating element 14 having the leads 16 which are connected to a suitable source of electrical energy (not shown). The heater 14 heats the oil held within the upper portion of the tube to a temperature above the melting point of elemental indium, say 160° C.

As has been indicated above, small platelets of indium are fed to the top of tube 10. More particularly elemental indium in the form of a thin strip 18 is drawn from a supply roll 20 through a punch press 22 by the rolls 23. The strip 18 has a thickness that is accurately uniform within very close limits. The punch press 22 includes a punch 24 that is reciprocated to punch from the indium strip 18 discs 26 having a precisely uniform mass within close limits. The discs 26 may have, for example, a thickness of 0.003 inch and a diameter of 0.05 inch. The discs 26 fall into a trough 28 through which they pass to the top of tube 10. As previously described the discs are melted within the heated portion of the tube 10 to form droplets, which droplets solidify in passing through the cooler portion of the tube to form solid spheres. The spheres are collected at the bottom of flask 12.

As the flask 12 fills with spheres the oil level in tube 10 tends to rise. In order to maintain the oil level substantially constant the flask 12 is connected to an overflow tube 30 having a reverse bend 32 mounted at the level at which the oil within tube 10 is to be maintained and having a discharge end 34 through which excess oil can flow into a receiver 36. Also connected to flask 12 through the lower portion of tube 30 is a second tube 38 and funnel 40 through which oil can be added to the flask 12 and tube 10 if required.

When the desired volume of indium spheres has collected in flask 12, the apparatus is disassembled and the spheres removed from the flask. Any oil adhering to the spheres can be removed by washing them with a suitable volatile solvent such as trichlorethylene, carbon tetrachloride, acetone or methylethylketone. Thereafter the solvent is evaporated to produce the finished spheres.

It will be noted from the foregoing description that the mass of the indium spheres is accurately predetermined before spheroidization takes place. By utilizing an indium strip 18 having an accurately uniform diameter in conjunction with the punch 24 discs can be formed which are uniform in mass within very close limits. Since there is no change in the mass of these discs as they are spheroidized, the spheres formed are necessarily uniform in mass within close limits. Thus laborious mechanical sorting and grading of the indium spheres characteristic of prior processes is eliminated.

Since many embodiments of the present invention may be made and since many changes may be made in the specific embodiment illustratively described, it is to be understood that the foregoing description is to be interpreted as illustrative only and not in a limiting sense.

I claim:

1. The method of making small, uniformly-sized spheres of a low-melting-point metal which comprises establishing and maintaining a vertical column of a liquid having a boiling point higher than the melting point of said metal, heating an upper portion of said liquid column to a temperature above the melting point of said metal, punching a series of solid pieces of uniform mass from a strip of said metal having an accurately uniform thickness, feeding said metal pieces to the top of said column, whereby said pellets fall through said heated portion of said column wherein they are melted to form spheroidal droplets and thereafter fall through a relatively cooler portion of said column wherein they are cooled to form solid spheres, and collecting said spheres at a point near the bottom of said column.

2. A method of making indium spheres of substantially uniform masses and having diameters within the range 0.001 to 0.1" which comprises establishing and maintaining a column of a liquid having a boiling point above the melting point of elemental indium, heating an upper portion of said liquid column to a temperature below its boiling point and above the melting point of indium, punching from a strip of indium of accurately uniform thickness a series of solid indium platelets, feeding said platelets to the top of said column of liquid to cause said platelets to flow through the heated portion of said column whereby said platelets melt to form spherical droplets, causing said droplets to flow through an unheated portion of said column to solidify to form indium spheroids of accurately uniform mass, and collecting said indium spheroids at a point near the bottom of said column.

3. A method according to claim 2 and wherein said liquid is mineral oil.

4. A method according to claim 2 and wherein said liquid is ethylene glycol.

5. Apparatus for making small, uniformly-sized spheres of a low-melting-point metal comprising in combination, a vertically arranged tube filled with a liquid having a boiling point above the melting point of said metal, heating means associated with an upper portion of said tube for heating the liquid in said upper portion to a temperature above the melting point of said metal, and feeding means for feeding non-spherical solid platelets of said metal to the top of said tube whereby said platelets fall through the heated portion of said tube wherein they are melted to form spheroidal droplets and thereafter fall through a relatively cooler portion of said column wherein they are cooled to form solid spheres, said feeding means including a punch press for punching said platelets from a strip of said metal and conveying means interposed between said punch press and tube for conveying punched platelets of said metal from said punch press to the top of said tube.

6. Apparatus for making small, uniformly-sized spheres of a low-melting-point metal comprising in combination a vertically arranged tube filled with a liquid having a boiling point above the melting point of said metal, heating means associated with an upper portion of said tube for heating the liquid in the upper portion of the tube to a temperature above the melting point of said metal, a punch press for punching non-spherical solid platelets of said metal from a strip of said metal having an accurately uniform thickness, a trough having an inlet end adapted to receive said punched platelets and a discharge end positioned over the top of said tube whereby the punched platelets flow into the liquid in said tube, then downwardly through the heated portion of said tube wherein they are melted to form spheroidal droplets and through a relatively cooler portion of said tube wherein they are cooled to form solid spheres.

7. Apparatus for making small, uniformly-sized spheres of a low-melting-point metal comprising in combination a vertically arranged tube having a receiver connected to its lower end, said tube and receiver being substantially filled with a liquid having a boiling point above the melting point of said metal, heating means associated with an upper portion of said tube for heating the liquid in said upper portion to a temperature above the melting point of said metal, a punch press for punching solid pellets of said metal from a strip of said metal of substantially uniform thickness, a feed trough having an inlet end positioned to receive said punched pellets and deliver them to the upper end of said tube, and overflow means effectively connected to said tube to maintain the liquid level in said tube substantially constant as said pellets are fed thereto.

References Cited in the file of this patent

UNITED STATES PATENTS

| | | |
|---|---|---|
| 1,393,383 | Linebarger | Oct. 11, 1921 |
| 1,944,464 | Richardson | Jan. 23, 1934 |
| 2,038,251 | Vogt | Apr. 21, 1936 |
| 2,045,699 | Cramer | June 30, 1936 |
| 2,076,798 | Teeple | Apr. 13, 1937 |
| 2,356,222 | Coxe | Aug. 22, 1944 |
| 2,566,567 | Hutchinson et al. | Sept. 4, 1951 |